United States Patent [19]

Suzuki

[11] 4,307,527
[45] Dec. 29, 1981

[54] METHOD AND MATERIALS FOR MANUFACTURING A DISPLAY DEVICE

[75] Inventor: Masakatsu Suzuki, Sendai, Japan

[73] Assignee: Three Bond Co., Ltd., Hachioji, Japan

[21] Appl. No.: 111,873

[22] Filed: Jan. 14, 1980

[30] Foreign Application Priority Data

Jan. 17, 1979 [JP] Japan .................................. 54-4314
Jan. 17, 1979 [JP] Japan .................................. 54-4397

[51] Int. Cl.$^3$ ............................................. G09F 7/16
[52] U.S. Cl. .................................. 40/10 D; 264/259; 428/13; 428/413
[58] Field of Search ..................... 156/224; 248/504; 428/13, 187, 413; 264/271, 230, 259; 40/324

[56] References Cited

U.S. PATENT DOCUMENTS

| 2,704,211 | 3/1955 | Decepoli | 428/66 X |
| 3,217,617 | 11/1965 | Wiswell | 264/259 X |
| 3,312,197 | 4/1967 | Smith | 264/271 X |
| 3,578,548 | 5/1971 | Wesp | 428/315 |
| 3,725,112 | 4/1973 | Hansen | 428/13 |

Primary Examiner—Henry F. Epstein
Attorney, Agent, or Firm—Donald D. Mon

[57] ABSTRACT

A method of manufacturing a display device for displaying the function of a switch or the like. A body is formed with a cavity, and a sheet bearing a display is then positioned in the bottom cavity. The cavity is then filled with a transparent synthetic epoxy resin with a poly-oxy-propylene-amine for curing. Preferably a small amount of the material is placed on the bottom of the cavity before the display sheet is installed in order to secure the sheet to the bottom and prevent it from warping after the remaining resin is added.

10 Claims, 4 Drawing Figures

METHOD AND MATERIALS FOR MANUFACTURING A DISPLAY DEVICE

BACKGROUND OF THE INVENTION

The present invention relates to a method of manufacturing a device for displaying the function of a switch or other operable device, for example, switches used in controls for water pipes, gas pipes, or electric circuits.

Recently, improved devices for displaying the function of a switch used in the controls for water pipes have been developed to improve visibility and reading of its displayed letters or symbols, with improved appearance and resistance to soiling or peeling. In these improved display devices, a cavity is formed as part of a metal body and a sheet having the necessary letters, symbols or figure is placed on the bottom face of the cavity. The cavity is then filled with a transparent synthetic resin and cured. However, the paper used for the sheet in that display device may not contact the bottom face of the cavity evenly due to warping of the paper. This results in a distorted image of the display when viewed through the transparent synthetic resin. Where a stiff sheet which does not produce warp is employed for a display sheet, air remains between the sheet and the bottom face of the cavity and bubbles may later appear in the cured resin, which spoils the appearance of the display. If a sheet precoated with adhesive on its reverse side is employed, it is difficult to set the sheet in position in the manufacturing process because the cavity is small. Moreover, adhesives will produce stripes in cured resin due to the differences between an adhesive and a resin.

Disclosures of previous devices do not describe any specific transparent resin. However, a suitable resin should have certain physical mechanical properties. For example, the resin should be of sufficiently low viscosity to provide workability and yet avoid confinement of air bubbles. It should also be of sufficiently high viscosity when in a paste state that it will rise in the middle to produce a convex lens effect when in the cured state. The resin also should not produce a crease on the surface when curing, and should not be curable at normal (room) temperature. When the resin is heated, the curing speed should still be low enough to disperse air, while on the other the resin should cure rapidly enough, at a low enough temperature as not to deteriorate the display sheet. The resin must therefore meet various requirements which seem incompatible, or are inconsistent with each other. In addition, the resin should have good transparency, heat resistance, chemical resistance, water resistance and weather resistance to prevent deterioration such as yellowing with the passage of time and should be hard enough not to be easily marred such as by fingernails.

BRIEF SUMMARY OF THE INVENTION

Therefore, it is an object of the present invention to eliminate said drawbacks and to resolve said problems by employing an epoxy resin and poly-oxy-proplylene-amine to obtain the characteristics required of the said transparent resin.

Another object of the invention is to provide a method for manufacturing a display device in which the same synthetic resin used to fill the cavity is used on the bottom face of the cavity before the sheet is installed to prevent bubbles, so that when the display sheet is pressed against the bottom face, a part of the resin seeps around the edge of the sheet, and that part of the resin holds down the edge of the sheet and prevents it from warping. The sheet is readily and accurately positioned.

An example shall be explained in conjunction with the accompanying drawings in the following description.

DETAILED DESCRIPTION OF THE DRAWINGS

Figure 1:
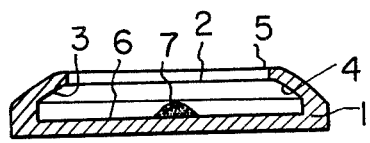
FIGS. 1 to 4 are axial cross-sectional views illustrating the sequence in the method of manufacturing the present invention.

As seen in FIG. 1, a cavity 2 of circular shape is formed on the upper face of a metal body 1. The cavity flares downwardly and its inner peripheral surface 3 forms a conical shape which expands as it extends downwardly. The outer peripheral surface 4 of the metal body 1 also has a conical shape which is inclined at a steep angle upward toward the center of the body 1. The edge 5 connects surface 4 to the surface 3 at an acute angle.

As seen in FIG. 1, a small amount or drop of uncured resin 7, the same as the transparent synthetic resin described hereinafter, is deposited on the center of bottom face 6 of the cavity 2.

Figure 2:
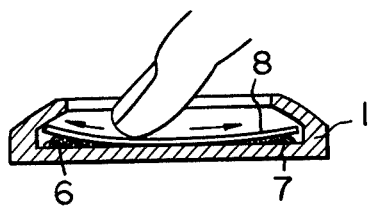
Figure 3:
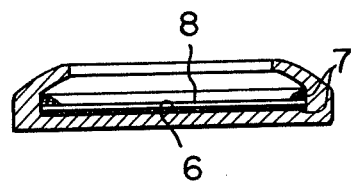

As seen in FIG. 2. A sheet 8 bearing the desired display (not shown) such as letters, symbols or figures is positioned in the cavity 2 with the reverse side of the sheet facing downward, and the center of the sheet 8 in contact with the resin drop 7. The center of the sheet is pressed downward by a finger which is gradually slid outwardly as indicated by the arrows, causing the drop of resin to spread outwardly evenly between sheet 8 and bottom face 6.

Thus, the sheet 8 is accurately positioned in contact with the bottom face 6, and the drop of resin 7 spreads evenly over the whole area between sheet 8 and face 6 without any air bubbles. A portion of the resin 7 seeps up around the edge of the sheet 8, so that the resin holds the edges of the sheet 8 down to prevent warping. Thus the sheet 8 is accurately positioned in contact with the bottom face 6.

Figure 4:
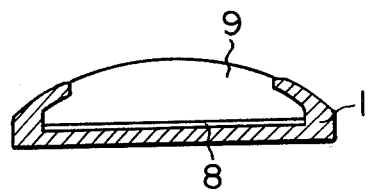

The cavity 2 is then filled with transparent synthetic resin 9 as shown in FIG. 4.

The transparent synthetic resin 9 is a mixture of epoxy resin and a poly-oxy-propylene-amine having a ratio which is determined by epoxy equivalence and amine equivalence. The poly-oxy-propylene-amine is a primary di-amine or tri-amine of an aliphatic series which is a derivative of poly-propylene-glycol or toluol. There are four grades of the poly-oxy-propylene-amine namely D-320, D-400, D-2000 and T-403 in which D means di-amine type, T means tri-amine type, and the suffix numeral indicates average molecular weight. The chemical formulas are as follows:

For the D amines:

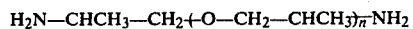

for the T amines:

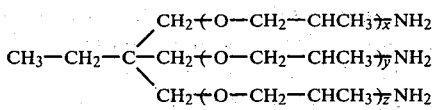

in the D amines, n is approximately 2.6 for D-230
n is approximately 5.6 for D-400
n is approximately 33.1 for D-2000

In the T amines, x+y+z is between about 3 and about 8, preferably 5.3. x, y and z are all at least 1.

A suitable epoxy resin for use with any of the foregoing is, for example:

There is no limitation on the selection of epoxy resin, but the viscosity of the epoxy resin should be less than about 9000 CPS (centipoise).

The body 1 is filled with said resin 9 and is heated to approximately 80° C. (centigrade) temperature. The resin will completely cure in about 2 hours. The resin 9 is a transparent synthetic resin which when confined at the edge of the cavity will expand naturally by the surface tension of the liquid resin in the upper middle to form a spherically convex lens as shown in FIG. 4.

As explained above, in the present invention a sheet 8 having the necessary display is positioned accurately on the bottom face of the cavity by the resin 7 which is identical to the resin used to fill the cavity 2, thus there is no problem of compatibility between resins, and no strips are produced in the cured resin.

Further, in the present invention the material comprising epoxy resin and poly-oxy-propylene-amine employed as the transparent synthetic resin, is sufficiently low in viscosity because of the high rate of primary amine, and is easy to handle, allowing air remaining between the sheet and the bottom face of the cavity to escape efficiently. Moreover, the viscosity of the resin lowers the temperature and rate of curing sufficiently to allow air bubbles produced by heating the escape efficiently eliminating bubbles in the cured transparent resin. On the other hand, the resin cures fast enough that the quality of the sheet 8 does not deteriorate. Also, the cured resin has good transparency, is water-proof and chemical-proof, has a flexibility and hardness which is not easily marred such as by a fingernail, and does not deteriorate with the passage of time.

Moreover, in the present invention, when the sheet is in contact with the bottom face of the cavity, part of the resin securely holds the edge of sheet preventing any warping of the sheet.

This invention is not to be limited by the embodiments shown in the drawings and described in the description, which are given by way of example and not of limitation, but only in accordance with the scope of the appended claims.

I claim:

1. A method of manufacturing a display device, comprising: forming a body having a cavity with a bottom surface, positioning a sheet having a display on the bottom surface of said cavity, filling said cavity with transparent synthetic resin consisting of an epoxy resin and a poly-oxy-propylene-amine; and curing said transparent synthetic resin.

2. A method of manufacturing a display device according to claim 1, including adhering said sheet to the bottom face of the cavity with some of said synthetic transparent resin before filling said cavity with the remainder of said synthetic transparent resin.

3. A method of manufacturing a display device according to claim 2, wherein said cavity is first partially filled with a sufficient amount of said transparent synthetic resin so that when said sheet is positioned at the bottom of said cavity and pressed toward said bottom surface, a portion of the resin seeps up around the edges of said sheet to hold the edges of the sheet, whereby warping of the sheet is prevented.

4. A method according to claim 2 wherein said poly-oxy-propylene-amine resin is selected from a group consisting of D-320, D-400, D-2000 or T-403 type amines.

5. The method according to claim 4 wherein the uncured resin has a viscosity less than about 9000 CPS.

6. The method according to claim 2 wherein the step of curing comprises heating the resin to approximately 80° C. for approximately 2 hours.

7. A display device comprising: a body having a cavity with a bottom surface; a sheet bearing a display positioned in said cavity on said bottom surface; and a quantity of transparent resin between said bottom surface and sheet adhering said sheet to said bottom surface, and overlaying said sheet to fill said cavity, said resin consisting of an epoxy resin and a poly-oxy-propylene-amine and being uniform throughout.

8. A display device, according to claim 7 in which said resin is the heatcured product derived from the following combination:

a. an epoxy resin; and
b. an amine selected from the group consisting of poly-oxy-propylene di-amine and poly-oxy-propylene tri-amine.

9. A display device according to claim 8 in which said di-amine has the following formula:

with the molecular weight being between about 2.5 and 33.1.

10. A display device according to claim 8 in which said tri-amine has the following formula:

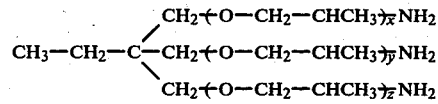

with x+y+z being between about 3 and about 8, x, y and z all being greater than one.

* * * * *